Feb. 9, 1965 C. C. CUTLER 3,169,245

PASSIVE REPEATERS FOR SATELLITE COMMUNICATION SYSTEMS

Filed May 15, 1959

INVENTOR
CASSIUS C. CUTLER
BY
[signature]
ATTORNEY

United States Patent Office 3,169,245
Patented Feb. 9, 1965

3,169,245
PASSIVE REPEATERS FOR SATELLITE COMMUNICATION SYSTEMS

Cassius C. Cutler, Gillette, N.J., assignor to Bell Telephone Laboratories, Incorporated, New York, N.Y., a corporation of New York
Filed May 15, 1959, Ser. No. 813,565
3 Claims. (Cl. 343—18)

This invention relates to radio relay systems and repeaters therefor and more particularly to reflectors to be used as the passive repeaters in radio relay systems employing earth satellites in orbit as the repeater stations.

With recent advances in space technology, it has been demonstrated that it is both possible and reasonable to plan radio relay communication systems which rely upon repeater stations placed as satellites in orbits about the earth. In the design of such radio relay systems, many factors require consideration and one of these which is of prime importance in optimizing the performance of a given system for a given cost is that involving the choice of repeater station configuration. Broadly, the space satellite repeaters proposed fall into two classes. Those known as active repeaters involve the provision of a radio receiver, a radio transmitter, and means for introducing amplification between the two so that a weak signal received from earth may be redirected to another point on earth with increased signal strength. Repeaters of the other class are known as passive repeaters and constitute no more than some form of reflector by which a signal received from a point on earth may be reradiated with a change of direction to reach some other point on earth. Passive repeaters, of course, are of particular interest because in their simplest forms they do not require the provision of a primary power source of relatively high capacity in the satellite vehicle. The present invention is directed to improvements in passive repeaters as above defined.

The most commonly proposed passive repeater for a satellite communciation system has been a large sphere made of conductive material, or at least having a conductive coating on its surface, which is placed in a predetermined orbit by means of a rocket or guided missile. Such spherical reflectors are of particular interest because they may comprise a balloon which is inflated after the missile carrier has reached the desired orbit. Such balloons represent a very small weight and can be made quite large to serve as an adequate reflector of radio frequency waves.

Such spherical reflectors, however, have the disadvantage that as passive repeaters they are of relatively low efficiency in terms of the amount of energy reflected in a useful direction as a function of the amount of incident energy. Of the energy falling upon the surface of a sphere, only a very small amount is reflected in the direction of the earth. All of the remaining energy is reflected or dispersed into outer space and is lost. Stated in another manner, only a relatively small portion of the surface of a spherical reflector is of practical use as a passive repeater. Thus the designer of the repeater station is faced with the necessity of placing a large body in orbit in order to utilize a very small portion of the surface of that body as the reflector for a radio relay system.

It is the object of the present invention to reduce the size of passive satellite repeaters required to provide a given return of energy to a receiving station in response to the radiation of a given amount of energy from a transmitting station.

In accordance with this object, the passive repeater comprises a body having a curved surface, the curvature of which in at least one direction of curvature is much less than the average curvature of the surface together with means for so orienting the body in space as to present the curved surface as a reflector for incoming radio frequency signals.

The above and other features of the invention will be described in the following specification taken in connection with the drawing in which.

As has been indicated above, the most practical passive repeaters envisioned at the present time comprise spherical balloons of metalized fabric which may be lifted into orbit in a collapsed, and therefore compact, condition and then inflated to present a large reflecting surface. It has further been stated that for a given size the usual spherical balloon represents a relatively inefficient reflector for radio frequency energy because only a very small portion of its surface is utilized for the reflection of energy in a desired direction. The present invention contemplates the provision of repeaters which may comprise balloons or other bodies, the surface configurations of which are so chosen as to provide a more efficient reflector for the same weight or volume.

Figure 1:
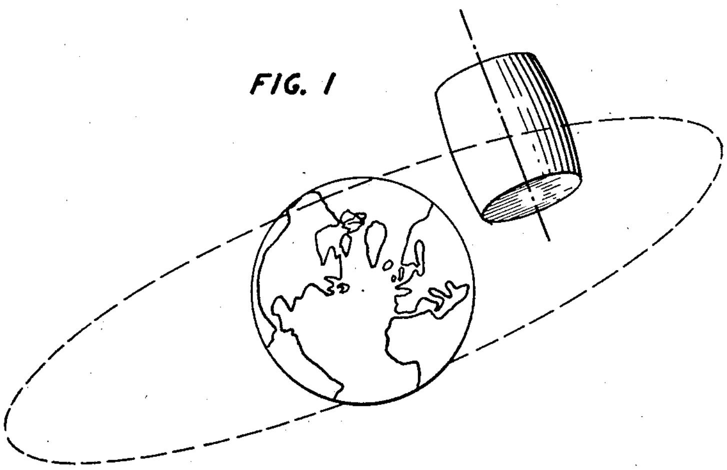
FIG. 1 is a diagrammatic representation of one form of passive repeater satellite for use in space satellite communciation systems.

The passive repeater satellite shown in FIG. 1 of the drawing is essentially a barrel shaped body. This body may be made in the form of a balloon and, like the spherical balloon, lifted into a desired orbit before inflation, or it may be constructed and erected in any other convenient manner. It will be recognized that the barrel shaped reflector of FIG. 1 presents a doubly curved surface which in one direction of curvature (that in any plane intersecting the generatrix and the surface of revolution) constitutes a continuous closed surface but in another direction of curvature (for example, that in a plane intersecting at least one end of the barrel) presents a surface, the curvature of which changes substantially at the ends of the barrel. The intersection of the sides of the barrel with the ends may, for example, constitute a curved portion of small radius or some other transition may be employed as required to prevent or reduce edge effects in the reflecting surface. The use of a reflecting body of this nature has several important consequences. First, the curved surface may be designed to reflect a large proportion of the energy incident thereupon in a desired direction. This characteristic is not obtainable with a sphere. At the same time, however, the use of a reflecting body which, unlike a sphere, is not symmetrical in all directions, immediately introduces the problem of the control of orientation in space so that the desired portion thereof will at all times be presented to incoming radio frequency signals or waves at such an angle as to reflect these waves to a desired receiving location on earth.

It is in this connection that the barrel shaped passive repeater is of particular interest. It is well known that a body having unequal moments of inertia about possible axes of rotation will tend to spin most stably about the axis of the principal or greatest moment of inertia. Further, when a body is caused to spin about this axis, gyroscopic action will tend to maintain a fixed orientation of the axis in space. Thus, if the barrel shaped reflector of FIG. 1 is launched in orbit with an initial spin about the principal axis of inertia and this principal axis is oriented at right angles to the plane of the orbit, it will tend to maintain this same spatial orientation and the barrel can be thought of as rolling around the earth in the desired orbit. Under these circumstances, the doubly curved surface, the curvature of which may be chosen to provide a desired pattern of reflected energy, is always presented as a reflector to both the transmitting and receiving stations on earth and the requirement for the passive repeater is thus met. The requisite initial spin may be imparted while the reflector is still attached to the missile which is provided to lift it into orbit. Such spin stabilization has already been used in connection with the later stages of multistage rockets and may be provided by a small motor energized before the reflector is released. Such an arrangement is shown schematically in FIG. 3 of the drawing. In this arrangement, the satellite vehicle is accelerated by an electric or similar motor to rotate about its axis of principal moment of inertia during the transport of the satellite into the desired orbit. At this point, and in accordance with well-known techniques, the spinning satellite body is released from the rocket carrier. This arrangement has been employed in the Explorer I satellite and is described, for example, in the publication entitled "Ten Steps Into Space," published as Monograph #6 by the Journal of the Franklin Institute, Philadelphia, Pennsylvania, December, 1958, pages 89 through 113.

Figures 2, 3:
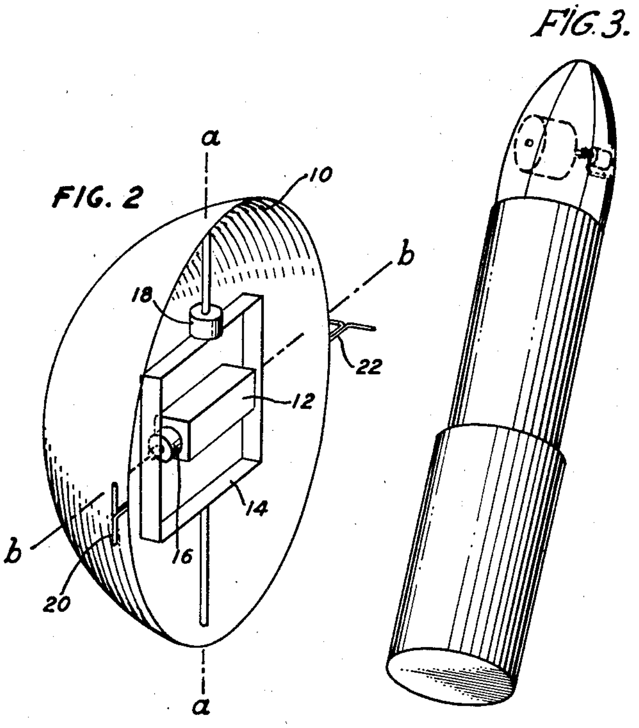
FIG. 2 is a representation of an alternative form of passive repeater in accordance with the invention.
FIG. 3 is a representation of a launching vehicle indicating the manner in which an initial spin may be imparted to a passive repeater satellite according to the invention.

Another passive repeater according to the invention and capable of even higher efficiency as above defined as a reflector of radio signals from one point on earth to another point on earth is shown in FIG. 2 of the drawing. Here, the reflector 10 is essentially saucer shaped and may conveniently be thought of as a small portion of the surface of an extremely large sphere, although curvature other than spherical may be desirable and may be employed in accordance with the invention. The surface of this saucer shaped reflector is thus equivalent to the useful portion of the surface of a sphere many times larger and thus many times heavier than the saucer shaped reflector. Here, too, the edge of the reflector may be specially formed to prevent adverse effects upon the reflecting characteristics. Thus the edge of the saucer may be formed by a gradual change in radius of curvature or the edge may be serrated or otherwise interrupted to prevent edge effects.

Of course this type of reflector requires orientation in space so that the convex surface thereof is always presented to the incoming radio wave in such a way as to reflect it in a desired direction. Here, spinning the body about the axis of greatest moment of inertia will not suffice since the geometrical shape of the body is not favorable for this type of orientation. While many arrangements are available for orienting an object in space, that suggested in FIG. 2 is simple and well known and will serve to illustrate the invention. Thus, in the arrangement of FIG. 2, the saucer shaped reflector 10, which may be either a specially shaped balloon coated with a conducting material or other structure having a suitable reflecting surface, is mounted in a gimbal suspension for rotation about axes *aa* and *bb* with respect to an inertial platform 12. Inertial platforms are now well known in the art and in their simplest form utilize a plurality of gyroscopes mounted with their rotational axes mutually orthogonal, together with means for driving the gyroscopes. Such a platform is illustrated in Van Nostrand's Dictionary of Guided Missiles and Space Flight, edited by Grayson Merrill, at page 299 thereof. If this platform is launched with a particular orientation in space, it will tend to maintain the spatial orientation as it circumnavigates the earth in orbit. What is required, then, is a means of adjusting or rotating the reflector 10 with respect to the inertial platform 12 in such a way as always to present the convex reflecting surface to the incoming radio waves from earth.

It will be recognized that once the satellite is in orbit, very little force is required to change its position. Accordingly, very small motors are all that are required to orient even a very large reflector with respect to a relatively small inertial platform. As shown in FIG. 2, a gimbal ring 14 is mounted for rotation with respect to platform 12 about axis *bb* and a motor 16 mounted on the platform is provided to accomplish such rotation. A second motor 18 is mounted on gimbal ring 14 and is arranged to rotate reflector 10 about axis *aa* with respect to the gimbal ring. This simple mounting will permit the desired orientation of the reflector shown in FIG. 2 since this particular reflector is assumed to have the same curvature along any direction on the reflecting surface. If the curvature differs for different directions, the mounting will have to be more complicated and will ordinarily require an additional gimbal so that the reflector may be rotated about three axes rather than two, as shown. Power for operating motors 16 and 18, as well as the gyroscopes of the inertial platform, may be conveniently obtained from solar batteries mounted on the reflector in such locations and in such number as to provide for a sufficient supply of current in response to the radiation from the sun. The application of such solar batteries for providing operating power for communication and other purposes in a space satellite was employed in the Vanguard II satellite. (See, for example, page 115 of Part I of the record of the Hearings Before The NASA Authorization Subcommittee of the Committee on Aeronautical and Space Sciences, United States Senate, Eighty-Sixth Congress, First Session.) Another arrangement employing these batteries is illustrated at page 212 of the same publication.

Control of motors 16 and 18 to maintain proper orientation of reflector 10 may be by any convenient system of radio telemetry. For example, the necessary changes in orientation can be computed in advance and radio signals transmitted to the satellite to control its orientation.

Alternatively, the radio wave of the system for which the satellite is the repeater may be employed. For this purpose, receiving antennae 20 and 22, shown here as miniature dipoles, are mounted on the reflector and are so located as to intercept a small portion of the radio frequency energy transmitted from earth toward the repeater. The radio frequency energy thus intercepted by the two antennas is applied to simple radio receivers, the outputs of which are adapted to be maximum at the time which the reflector is properly oriented with respect to the transmitter site on earth. These receivers, which may be constructed of solid-state devices such as transistors or diodes, require such small amounts of power that they too may be powered by solar batteries and the outputs of the receivers may be employed as signals for control of the two motors mentioned heretofore to adjust the orientation of the reflector.

It should be pointed out that the orientation problem is not a severe one since very small amounts of power are required and only relatively low speeds of adjustment are needed. Obviously, many other orientation means are available but it should be emphasized that the particular means chosen should have a low enough power requirement to make the use of the oriented passive repeater more attractive than the use of an active repeater with its inherent power requirement for signal amplification.

What is claimed is:

1. A passive repeater for a satellite communication system having transmitting and receiving stations at spaced locations on earth comprising a body in orbit about the earth and having a doubly curved surface of material which will reflect incoming radio frequency energy, said body having a convex surface, the curvature of which along at least one direction of curvature is substantially less than the average curvature of the surface, and means for orienting said body to present said doubly curved surface as a reflector for incoming radio frequency energy at a predetermined angle with respect to said transmitting and receiving stations.

2. A passive repeater for a satellite communication system comprising a body having a doubly curved surface, the curvature of which along at least one direction of curvature is much less than the average curvature of the surface, and means for orienting said body to present the convex face of said doubly curved surface as a reflector for radio frequency energy reaching said repeater from a predetermined direction.

3. A passive repeater for a satellite communication system comprising a barrel shaped body having an exterior surface which reflects radio frequency energy launched in an orbit about the earth, said body being adapted for launching in orbit with an initial spin about its axis of greatest moment of inertia to fix the orientation thereof with respect to the plane of said orbit.

References Cited in the file of this patent

UNITED STATES PATENTS

| | | |
|---|---|---|
| 2,461,181 | Rosenberg | Feb. 8, 1949 |
| 2,716,191 | Bartuska et al. | Aug. 23, 1955 |
| 2,835,890 | Bittner | May 20, 1958 |

FOREIGN PATENTS

| | | |
|---|---|---|
| 1,070,702 | Germany | Dec. 10, 1959 |

OTHER REFERENCES

Clarke: "Extra-Terrestrial Relays," Wireless World, October 1945, pp. 305–308.

Pierce: "Orbital Radio Relays," Jet Propulsion, vol. 25, No. 4, April 1955, pp. 153–157.

Angle: "Attitude Control Techniques," Navigation, vol. 6, No. 1, Spring 1958, pp. 66–71.